(12) United States Patent
Visinoni et al.

(10) Patent No.: US 11,584,556 B2
(45) Date of Patent: Feb. 21, 2023

(54) SYSTEM AND METHOD FOR FILLING A CLOSED CONTAINER WITH A FIXATIVE SOLUTION

(71) Applicant: Milestone S.r.l., Sorisole (IT)

(72) Inventors: Francesco Visinoni, Mozzo (IT); Matteo Minuti, Brignano Gera d'Adda (IT); Marco Bellini, Bergamo (IT); Michele Bellini, Villongo (IT); Michele Martinelli, Brembate (IT)

(73) Assignee: MILESTONE S.R.L., Sorisole (IT)

( * ) Notice: Subject to any disclaimer, the term of this patent is extended or adjusted under 35 U.S.C. 154(b) by 0 days.

(21) Appl. No.: 17/378,865

(22) Filed: Jul. 19, 2021

(65) Prior Publication Data

US 2021/0339898 A1 Nov. 4, 2021

Related U.S. Application Data

(63) Continuation of application No. 16/414,032, filed on May 16, 2019, now Pat. No. 11,117,695.

(30) Foreign Application Priority Data

Sep. 6, 2018 (EP) .................. 18 192 858

(51) Int. Cl.
| | |
|---|---|
| *B65B 31/02* | (2006.01) |
| *A61J 1/14* | (2006.01) |
| *B65B 3/00* | (2006.01) |
| *B65B 3/26* | (2006.01) |
| *A01N 1/02* | (2006.01) |

(52) U.S. Cl.
CPC .......... *B65B 31/028* (2013.01); *A61J 1/1475* (2013.01); *B65B 3/003* (2013.01); *B65B 3/26* (2013.01); *A01N 1/02* (2013.01)

(58) Field of Classification Search
CPC ......... B65B 31/028; B65B 3/003; B65B 3/26; B65B 43/59; A61J 1/1475; A01N 1/02
USPC ................................................. 141/348, 329
See application file for complete search history.

(56) References Cited

U.S. PATENT DOCUMENTS

| | | | | |
|---|---|---|---|---|
| 5,443,791 A | * | 8/1995 | Cathcart | ............. B01L 3/50825 |
| | | | | 422/65 |
| 2017/0121046 A1 | * | 5/2017 | Diaz | ....................... B65B 3/003 |

FOREIGN PATENT DOCUMENTS

WO WO-2020016727 A2 * 1/2020 ......... A61B 10/0096

* cited by examiner

*Primary Examiner* — Mary E McManmon
*Assistant Examiner* — Christopher M Afful
(74) *Attorney, Agent, or Firm* — The H.T. Than Law Group (57) ABSTRACT

The present invention relates to a method and a system (400) for filling a closed container (200) with a fixative solution. The system comprises a container (200) comprising a container body (230) for receiving a biological specimen, a lid (220) for selectively closing the container body (230) and a port (100) forming a unidirectional barrier in a direction from the inside (IC) to the outside (OC) of the closed container (200). The system further comprises a dispensing apparatus (500) having a filling nozzle (300) for dispensing the fixative solution. The filling nozzle (300) is relatively moveable with respect to the container (200) between a retracted position and a filling position to fill the container (200) with the fixative solution.

13 Claims, 8 Drawing Sheets

SYSTEM AND METHOD FOR FILLING A CLOSED CONTAINER WITH A FIXATIVE SOLUTION

CROSS-REFERENCE TO RELATED PATENT APPLICATIONS

The present patent application is a continuation patent application under 35 U.S.C § 120 to parent patent application bearing Ser. No. 16/414,032 filed on May 16, 2019, which claims priority to European patent application no. 18 192 858.1 filed on Sep. 6, 2018. The parent U.S and EP applications are incorporated herein by reference in their entireties.

FIELD OF THE INVENTION

Background of the Invention

The present invention relates to a system and a method for filling a closed container with a fixative solution. The system comprises a container for receiving a biological specimen, and a dispensing apparatus having a filling nozzle for dispensing the fixative solution.

Standard practices in operating rooms call for delivering to the operating theater containers of different shapes and volume (e.g. buckets with lid) that are prefilled with a fixative. In the large majority of cases, the fixative is 10% neutral buffered formalin. During surgery, for example, the nurse places the specimen excised from the patient in such containers. In particular, the nurse opens the container (e.g. opens the lid), places the specimen in a container that already contains formalin, closes the lid and then sticks a label with the patient's name, code and/or other related information on the container to clearly identify the container and the specimen contained therein. Then, the container with the specimen is sent to the histology laboratory or anatomical pathology laboratory for analysis. The laboratory can be close to the operating room as well as in a distant place, for example another city.

However, opening a container that is pre-filled with formalin in the operating room exposes staff and patients to dangerous fumes of formalin.

The declaration issued by the International Agency for Research on Cancer (International Agency for Research on Cancer (2006), "Monographs on the evaluation of Carcinogenic Risk to humans.", IARC, Vol. 88, Lyon, France) classified formaldehyde as a Class 1 carcinogenic. However, formalin (i.e. a water-formaldehyde solution) is still one of the most preferred fixatives used in practice since it is very effective for preserving specimen.

Following the aforementioned declaration, several devices were developed to reduce or to avoid the exposure to such dangerous formalin fumes. In particular, the following documents are known in the state of the art:

WO 2015/092 772 A1, which discloses a semi-automatic, anti-contamination safety system for the operator that is applied to thermo-sealing machines for filling and sealing containers with liquids.

EP 2 524 595 B1, which discloses a method and a system for automatically dispensing a fixative solution in a flexible bag containing at least one biological specimen.

WO 2017/114 598 A1, which discloses a completely automatic machine and method for packaging, preservation and transport of surgical, histological, cytological and autopsy specimens.

The aforementioned documents address the problem of how to avoid the use of formalin pre-filled containers in the operating room by dispensing the formalin in the container only after the specimen is placed in the container.

However, EP 2 524 595 B1 is limited to the use of flexible bags. However, some hospitals prefer to use rigid containers, such as buckets with lids.

Furthermore, WO 2015/092 772 A1 and WO 2017/114 598 A1 teach a method that requires the following procedure:

In the operating room, the nurse places the excided specimen in an empty container, i.e. without formalin. The nurse may or may not close the container with a lid before the container with the specimen is moved, i.e. transferred, to an apparatus such as disclosed in WO 2015/092 772 A1 or WO 2017/114 598 A1. Moving the container is necessary since this kind of apparatuses is not placed in the operating room. Instead, usually they are placed somewhere in the operating block or close to the operating block. Once the nurse is in front of said apparatus, if a lid was placed over the container, it is removed to allow placing and filling the container in said apparatus. Finally, the apparatus dispenses an amount of formalin in the container and then seals the container with a thin plastic or pre-treated aluminum film.

However, it should be noted that moving the container without a lid from the operating room to the apparatus (which is usually outside the operating room) is not safe, since the specimen should be considered as a potential biological hazard, and thus, the specimen should be kept away from the public. In fact, outside from the operating room risk-reducing precautions that are expected for the operating room, such as venting system with high efficiency filter, sterilization, controlled contamination, proper clothes, mask or protective equipment, etc., are not applied.

Likewise, moving the container with a lid from the operating room to the apparatuses disclosed in WO 2015/092 772 A1 or WO 2017/114 598 A1 carries risks as well. In fact, once the nurse removes the lid in order to use the container on such apparatuses, the specimen is exposed to open air outside from the operating room, raising the same problem of exposing a potential biological hazard described before.

Similarly, the specimen is exposed to the risk of undergoing biological degradation when being exposed to the open air and thereby, deteriorating the quality of the results of the analysis.

SUMMARY OF THE INVENTION

It is thus an object of the present invention to provide a system and a method for dispensing a fixative solution (e.g. formalin) in a closed container, which overcome the aforementioned drawbacks.

The aforementioned objectives are solved by the subject-matter of the independent claims. The dependent claims define the central idea of the present invention in a particularly advantageous way.

According to a first aspect, the present invention relates to a system for filling a closed container with a fixative solution.

The system comprises a container comprising a container body for receiving a biological specimen, a lid for selectively closing the container body and a port forming a unidirectional barrier in a direction from the inside to the outside of the closed container.

According to the present invention, the term "lid" is generally to be understood as any kind and type of cover for an opening of (or in) the container.

According to the present invention, the expression of "closing the container body" is generally to be understood as closing (e.g. sealing/insulating) all sides of the container from the outside.

According to the present invention, the term "port" is generally to be understood as a connection or access of a container for controlled passage of materials and/or substances, such as gases, fluids, particles or solid material, or combinations thereof.

According to the present invention, the term "barrier" covers any kind and type of (substantial) blockage for the passage of (selective) materials and/or substances.

According to the present invention, the term "unidirectional" is generally to be understood as being responsive/effective in only one direction; i.e. one-way. Thus, a "unidirectional barrier" blocks passage of materials and/or substance in at least one direction.

The system comprises further a dispensing apparatus having a filling nozzle for dispensing the fixative solution.

According to the present invention, the term "filling nozzle" is generally to be understood as a mechanical structure and/or component for dispensing a substance in a controlled manner, i.e. the filling nozzle allows to portion and to release a substance in a (pre-)defined way.

The filling nozzle is relatively moveable with respect to the container between a retracted position, in which the filling nozzle is outside of the container, and a filling position, in which the filling nozzle is at least partially inside the container via the port to fill the container with the fixative solution.

According to the present invention, the expressions "filling position" and "retracted position" cover not only two discrete positions of the filling nozzle, but cover any position that falls within the aforementioned definition of said positions.

In other words, the present invention relates to a system that provides the capability to place a biological specimen in a(n empty) container, to close the container having the biological specimen inside with the lid and to fill the closed container via the port with a fixative solution dispensed from the filling nozzle.

In particular, the port forms a unidirectional barrier in a direction from the inside to the outside of the closed container. Thus, the lid and the port can be configured to inhibit potentially dangerous substances leaving the container. Thereby, it is possible to provide a container that allows transporting the biological specimen in a safe manner.

At the same time, it is possible to access the inside of closed container from the outside via the port, since the port forms the unidirectional barrier in an opposite direction. Consequently, it is not required to open the container by removing the lid to fill the container with the fixative solution. Thus, it is possible to reduce the risks of biological contamination caused by the biological specimen and the risks of tissue degradation caused by exposing the biological specimen to the outside.

Moreover, the filling nozzle of the dispensing apparatus can be moved relatively to the container between a retracted position, in which the filling nozzle is outside the container, and a position, in which the filling nozzle is at least partially inside the container via the port to fill the container with the fixative solution. Thus, it is possible to provide a dispensing apparatus for automatically filling a closed container. Thereby, the input of humans is not required during the filling process. Consequently, costs for manual labour can be reduced. Moreover, it can be avoided to expose humans to the risk of coming into contact with either the biological specimen or the fixative solution. Thus, the filling process can be provided in a very safe and cost efficient manner.

Thus, it can be achieved with the above described system according to the present invention that the filling of a closed container with fixative solution is executed in a risk reducing and particularly safe manner. Moreover, it is also possible to reduce incurring costs for operating the system and for filling the container with fixative solution.

According to a preferred embodiment of the present invention, the port and the filling nozzle may be configured in correlation with each other such that the unidirectional barrier is maintained when the filling nozzle is in its filling position.

According to the present invention, the expression "elements being configured in correlation with each other" is generally to be understood as defining a functional cooperative interaction between (structural features of) the respective elements.

Thereby, it can be achieved that the configuration of the port and of the filling nozzle are configured to inhibit potentially dangerous substances leaving the container even during the filling process. Consequently, the risk of humans coming into contact with either the biological specimen or the fixative solution during the filling process can be reduced at all relevant parts of the (filling) process. Thus, filling of the container with the fixative solution can be achieved in a particularly safe manner.

Thus, it can be achieved that the filling of a closed container with fixative solution is executed in a risk reducing and particularly safe manner.

According to a preferred embodiment of the present invention, the port may be a valve, preferably a one-way valve, a duckbill valve or a cross-slits valve. More preferred, the port may be an elastically deformable valve, which includes resiliently deformable lips. The deformable valve may be biased towards a closed position, preferably to urge the deformable lips into the closed position. Alternatively or additionally, the port may comprise a closing element like a plug for selectively forming a second, preferably bidirectional, barrier between the inside and the outside of the container by covering or by plugging the port. Alternatively or additionally, the closing element may form the second (bidirectional) barrier by covering or by plugging a receiving section of the port, wherein the receiving section is provided for the filling nozzle to enter the inside of the container.

According to the present invention, the expression "biased" may cover any state of being pre-loaded or deviating from a(n idle) resting position.

Thus, it is possible to provide the port in an economical and effective manner. Moreover, the costs for the producing and manufacturing the container can be reduced by providing the port with standard components. In addition, the risk of the unidirectional barrier being accidentally opened, for example during transport, can be reduced by providing additional components for eliminating this risk. Also, in case the port is formed by a defective component, the risk for humans being exposed to dangerous fumes escaping from the container can be significantly reduced.

According to a further preferred embodiment of the present invention, the container body comprises a bottom wall and at least one sidewall. The container body may be adapted to be suitable for receiving a biological specimen, for example by providing an opening that allows biological specimen to be placed inside the container.

Thereby, it is possible to provide a container that is particularly suitable for medical and/or biological applications. In particular, by providing a container that is suitable for receiving a biological specimen, it can be achieved that time for depositing the biological specimen inside the container can be reduced. Moreover, the risk of the biological specimen being corrupted by substances contained in the container material can be reduced. For example, substances may leave the material of the container when coming into contact with acidic or alkaline substances of the biological specimen. Consequently, the validity of the results of the analysis of the biological specimen can be improved and thereby, the overall analysis process can be optimized regarding time and costs.

The lid may be at least partially removably connected to the container body for selectively closing the container. Alternatively or additionally, the lid may be configured to sealingly or hermetically close the container, preferably by being sealingly engaged with the container. Preferably, the lid may be integrally formed or separately provided with the container. According to a preferred embodiment, the port may be provided at the lid and/or at the container body.

Thereby, closing and sealing of the container with the biological specimen inside can be provided in a simple and effective manner. Moreover, it is possible to replace the lid independently from the container in case of malfunction of the port and/or the lid. Additionally, a simple solution is provided to provide the container either together with or independently from the lid. Thus, it is possible to reduce the time for depositing the biological specimen inside the container as well as for the analysis.

According to a preferred embodiment, the dispensing apparatus, preferably the filling nozzle, may comprise a sensing unit, such as a camera, like a digital camera, an endoscopic camera, and/or a contactless sensor. The sensing unit may be configured to determine the position of the container with respect to the filling nozzle. Alternatively or additionally, the sensing unit may be configured to visualise the biological specimen inside the closed container. Moreover, the sensing unit may be configured to determine the filling level of the fixative solution inside the closed container also/instead.

Thereby, it becomes possible to acquire information about the content of the closed container without having to open the container. Thus, it can be avoided that a human is exposed to dangerous fumes of the fixative solution. Additionally, time and costs can be saved for opening and re-sealing the already closed container.

According to a preferred embodiment, the dispensing apparatus may comprise a working area for receiving the container. Moreover, the dispensing apparatus may further comprise a weighing unit for determining the weight of the closed container. Therein, the weighing unit may be provided at the working area. Alternatively or additionally, the weighing unit may be provided in a manner to be selectively moved between a weighing position and an idle, e.g. retracted, position.

Thereby, it can be achieved that parameters of the closed container and/or the biological specimen inside the container can be determined without the need for manual labour. For example, the weight of the container can be determined at various stages during the filling process without requiring the work or input of an operator. Thus, the risks for humans being exposed to dangerous fumes can be reduced even further. Additionally, incurring costs of the process can be reduced.

According to a preferred embodiment, the dispensing apparatus may comprise a moving unit. The moving unit may comprise a moveable unit for moving the filling nozzle and the container relative to each other. According to a preferred embodiment, the moving unit may comprise a centring unit for arranging the container at a defined position on, preferably in the middle of, the working area. Therein, the centring unit may comprise preferably at least three moveable brackets that are preferably equally distributed preferably around the circumference of the working area. Alternatively or additionally, the moveable brackets may be moveably linked to each other to simultaneously move the moveable brackets with each other.

Thereby, it is possible to move the filling nozzle relative to the container without the requirement of human interaction. Additionally, it is possible to place the container in a defined position within the dispensing apparatus. This allows to move automatically the container and the filling nozzle relatively to each other in a controlled manner. Thereby, the risk of a human being exposed to dangerous fumes escaping from the container can be reduced even further as human input for completing the filling process is not required.

According to a preferred embodiment, the system may further comprise a hold-down element for holding the container at least during the filling process in a (fixed) position, preferably the (aforementioned) defined position (set by the centring unit). The filling nozzle may comprise the hold-down element. Preferably, the hold-down element and the filling nozzle may be relatively moveable to each other, preferably moveable along a longitudinal axis of the filling nozzle. Thereby, the dispensing apparatus provides a solution for holding the container in a defined and fixed position during the filling process. Thus, the reliability of the system and safety for humans can be further increased as the risk of accidental spillage or tipping of the closed container during the filling process can be reduced. Additionally, by integrating the respective component into the filling nozzle the space required for the dispensing apparatus can be reduced.

According to a preferred embodiment, the filling nozzle may further comprise a sealing cover to selectively (sealingly) cover the port to the outside, at least in the filling position of the filling nozzle. Preferably, the hold-down element may comprise the sealing cover. According to a preferred embodiment, the filling nozzle may further comprise an antidripping unit, such as a valve, which is preferably disposed at a dispensing outlet or a tip of the filling nozzle. According to a preferred embodiment, the dispensing apparatus, preferably the filling nozzle, may further comprise a venting unit for extracting fumes escaping the container at least during the filling process. Preferably, the hold-down element or the sealing cover may comprise the venting unit.

Thereby, additional elements are provided within the system/on the dispensing apparatus/the filling nozzle that can increase the reliability of the fume reduction during the filling process. Thus, the protection of humans from the exposure with dangerous fumes can be improved even further. Additionally, by integrating the respective components into the filling nozzle the space required for the dispensing apparatus can be reduced and thus, the overall space requirement of the dispensing apparatus and/or the system can be lowered.

According to a preferred embodiment, the system may further comprise a control unit for controlling the dispensing apparatus, the filling nozzle, the sensing unit, the moving unit, and/or the weighing unit. Alternatively or additionally, the control unit may comprise an interface unit for communicating and/or distributing information relating to the system via a communication network. Additionally or alternatively, the control unit may be configured to determine, preferably numerically determine, the amount of the fixative solution required for the biological specimen, preferably based on characteristics of the biological specimen, such as weight and/or type and/or volume and/or dimension of the biological specimen inside the closed container.

Thereby, it can be achieved that the controller can automatically control the individual components of the system. Thus, the sequence of individual steps of the process as well as the interaction between individual elements of the system can be controlled and automated. Thereby, it is possible to reduce the time required for the filling process by optimizing the process. In addition, it is possible to reduce the costs incurring for the fixative solution as the required amount is tailored to the requirements of the biological specimen by applying a parameter based (numerical) calculation.

According to a preferred embodiment, the system, preferably the dispensing apparatus or the filling nozzle, may further comprise a label printer for printing information related to the filling process, e.g. collected by the control unit. Alternatively or additionally, the system may further comprise a code reader for reading a code, like a 2D barcode. Preferably, the code reader may transmit the information of said code to the control unit. Alternatively or additionally, the system may further comprise a control terminal for operating the control unit. Alternatively or additionally, the system may further comprise a storage area for storing (filled) containers before and/or after the filling process. Alternatively or additionally, the system may further comprise a receiver unit for moving the container into the dispensing apparatus, (and therefrom) preferably onto the working area. Alternatively or additionally, the system may further comprise an ejector unit for moving the container out of the dispensing apparatus, preferably out from the working area, to the storage area. Preferably, the receiver unit and/or the ejector unit preferably may be controlled by the control unit.

Thereby, additional elements are provided that can increase the operability, reliability, productivity and cost effectiveness of the system of the present invention. Thus, it is possible to reduce the risk for humans being exposed to dangerous fumes escaping from the container, for example, by reducing the probability of having to repeat an experiment due to a data mix-up. Consequently, also the security of humans can be increased by providing any of the aforementioned components.

According to a second aspect of the present invention, the present invention provides a method for filling a container with a fixative solution. The method comprises the following steps:
  providing a system according to the present invention,
  placing a biological specimen inside the container body;
  closing the container with the lid;
  placing the closed container inside the dispensing apparatus;
  moving the filling nozzle relatively to the container from its retracted position to its filling position to enter the inside of the container with the filling nozzle through the port, preferably such that the unidirectional barrier is maintained (preferably, the port and the filling nozzle may be configured in correlation with each other such that the unidirectional barrier is maintained when the filling nozzle is in its filling position);
  dispensing the fixative solution via the filling nozzle through the port in the filling position, and
  moving the filling nozzle relative to the container into its retracted position.

According to a preferred embodiment of the present invention, the method may additionally comprise at least one of the following steps:
  determining the weight of the closed container in the filling position of the filling nozzle;
  determining the weight of the closed container in the retracted position of the filling nozzle;
  aligning the port of the container with the filling nozzle before entering the inside of the container with the filling nozzle;
  calculating a desired or actual ratio between the volume of the fixative solution in the container and the weight of the biological specimen in the container;
  covering the port with the closing element after having filled the container with the fixative solution;
  ejecting the filled container out of the dispensing apparatus and preferably storing the container in the storage area;
  transferring information related to the filling process via the interface unit;
  automatically completing the steps of the method by the control unit.

By completing the steps of the aforementioned method it can be achieved that an (empty) container, which is suitable for receiving a biological specimen and which receives such biological specimen, can be filled with a fixative solution in a particularly safe and economical manner. In particular, the risk of humans being exposed to dangerous fumes of the fixative can be significantly reduce by removing the necessity of opening the container as well as eliminating the necessity of human interaction in the filling process. Moreover, the time for preparing the biological specimen for analysis can be reduced. In addition, costs for conserving the biological specimen inside the container can be reduced by determining the suitable amount of fixative solution in comparison to a process, in which the containers are already filled with the fixative solution before placing the biological specimen inside.

According to a third aspect, the present invention is directed to the use of a container, which has been described hereinbefore, in a system, which has been described hereinbefore.

Additionally, each of the individual elements of the system according to the present invention, i.e. the container and the dispensing apparatus, also forms an independent part, i.e. subject matter, of the present invention, respectively.

Thus, according to a further aspect of the present invention, a container is provided, which comprises a container body for receiving a biological specimen, a lid for selectively closing the container body, and a port forming a unidirectional barrier in a direction from the inside to the outside of the closed container. The port is preferably configured such that, in correlation with a filling nozzle in a filling position for filling the container with a fixative solution via the port, the unidirectional barrier is maintained when the filling nozzle is in its filling position. The container may comprise any of the features and characteristics of the container of the system described hereinbefore as well as the advantages resulting therefrom.

Thereby, it is possible to provide a container that allows transporting, processing and filling a biological specimen in a safe manner. In particular, the lid and the port can be configured to inhibit potentially dangerous substances leaving the container.

Moreover, according to another aspect of the present invention, a dispensing apparatus is provided with a filling nozzle for dispensing the fixative solution.

The filling nozzle is preferably relatively moveable between a retracted position (e.g. to be outside a container to be filled) and a filling position (e.g. to be at least partially inside said container via a port of the container) to dispense a fixative solution, preferably to fill the container with the fixative solution. The filling nozzle is preferably configured such that, in correlation with a port of the container forming a unidirectional barrier in a direction from the inside to the outside of the container, the unidirectional barrier is maintained when the filling nozzle is in its filling position.

The dispensing apparatus may comprise any of the features and characteristics of the dispensing apparatus of the system described hereinbefore as well as their advantages.

Thereby, it is possible to dispense fixative solution in/to a container via the filling nozzle in a controlled manner.

Furthermore, features, advantages and objects of the present invention will become apparent for the skilled person when reading the following detailed description of embodiments of the present invention and when taking in conjunction with the figures of the enclosed drawings.

In case numerals have been omitted from a particular figure, it cannot be followed that the respective features are not present in the particular figure. Instead, the numerals have been omitted for reasons of clarity of the figure unless stated otherwise.

DETAILED DESCRIPTION OF THE PREFERRED EMBODIMENTS

Figure 1A:
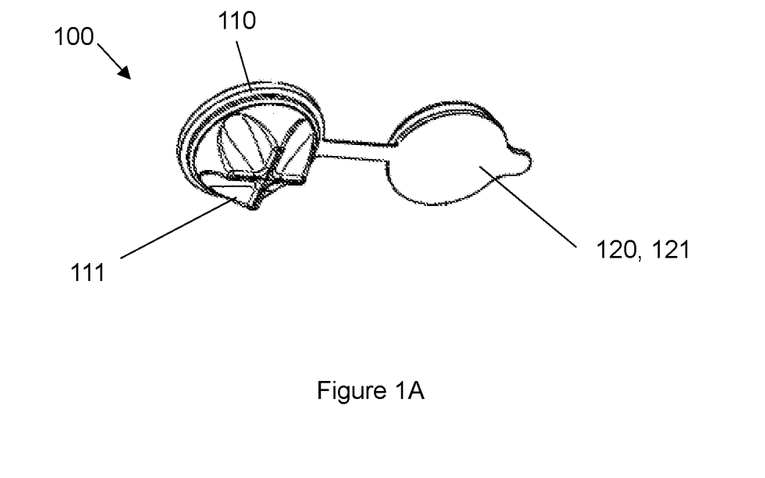
FIG. 1A shows a perspective rear view of an embodiment of a port according to the present invention.
Figure 1B:
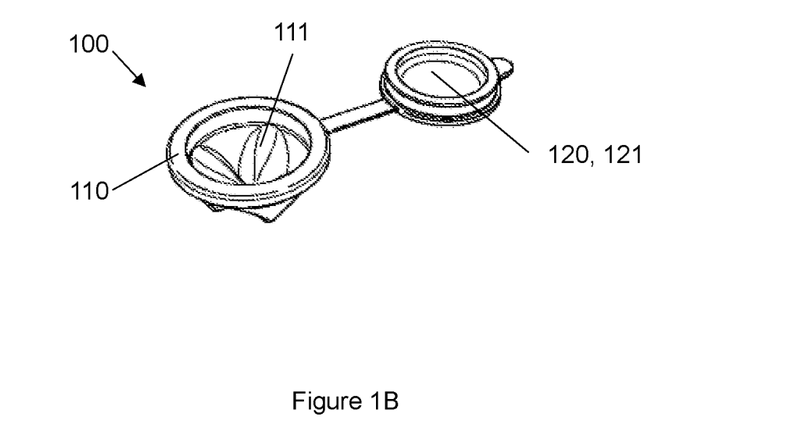
FIG. 1B shows a perspective front view of the port from FIG. 1A.
Figure 2:
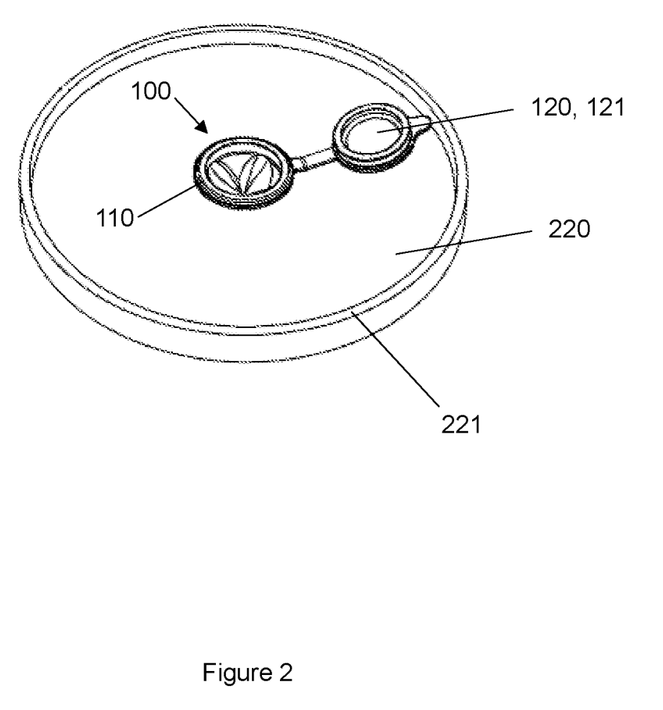
FIG. 2 shows a perspective view of an embodiment of a lid according to the present invention with a port according to FIG. 1A.
Figure 3A:
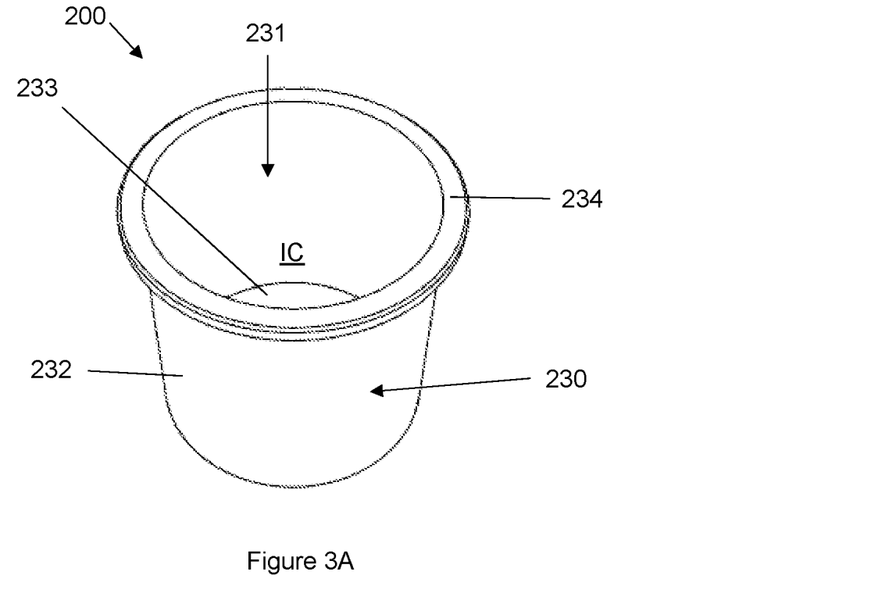
FIG. 3A shows a perspective view of an embodiment of a container body of a container according to the present invention.
Figure 3B:
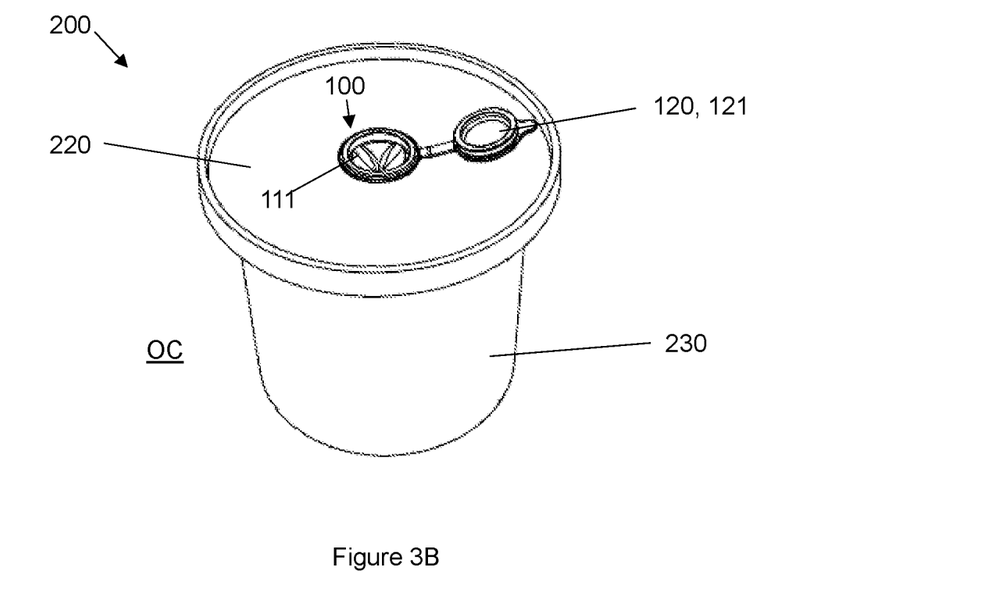
FIG. 3B shows a perspective view of an embodiment of a closed container according to the present invention with a container body according to FIG. 3A and a lid according to FIG. 2.

FIGS. 4 to 8 show two different embodiments of a system 400 for filling a closed container 200 with a fixative solution. FIGS. 1 to 3 show different embodiments of elements of the system 400.

The system 400 comprises the container 200. In particular, FIGS. 3A and 3B show exemplary embodiments of the container 200. The container 200 comprises a container body 230 for receiving a biological specimen (not displayed).

The container body 230 may have a bottom wall 233 and at least one sidewall 232. In a preferred embodiment, the container body 230 may be cylindrical, such as a bucket. However, it is also conceivable that the container body 230 has different forms and shapes, such as a cubic or prismatic shape. In its working position, the container 200 may rest on the bottom wall 233. The container body 230 may be provided with an opening 231 on a side opposite to the bottom wall 233. In FIG. 3A, the opening 231 is on a top side of the container body 230. However, it is also conceivable that the opening 231 is provided on the sidewall 232 or on the bottom wall 233. A rim 234 may surround the opening 231. The opening 231 may be dimensioned in correspondence with the size of the biological specimen. The container body 230 may be formed of a material that is impermeable to gases, water, organic/inorganic (chemical) substances and/or gases. The container body 230 may be made of plastic, such as Polyethylene, Polypropylene, PET, PETG, PFA, or the like. The container body 230 may have a volume from 50 cm3 to 10 dm3.

The container 200 further comprises a lid 220 for selectively closing the container body 230. FIGS. 2 and 3B show exemplary embodiments of the lid 220.

The lid 220 may have any shape and form that is suitable for closing the container 200. In particular, the lid 220 may be configured to sealingly or hermetically close the container 200. The lid 220 may close the container 200 by being sealingly engaged with the container 200. Preferably, the lid 220 may close the container 200 by being sealingly engaged with the container 200 and the lid 200 may (completely) encompass the opening 231. In the examples of FIGS. 2 and 3B, the container 200 is sealingly closed by the lid 220 by engaging a flange 221 of the lid 220 with the rim 234 of the container body 230 such that the opening 234 is closed. The lid 220 may be made of a different material than the container body 230 or of the same material as the container body 230. The lid 220 may be at least partially removably connected to the container body 230 for selectively closing the container 200. Thus, the lid 230 may be suitable for selectively bringing the container 200 either in a closed state or in an opened state, in which it is, for example, possible to place the biological specimen inside the opened container 200. In a preferred embodiment, the lid 220 may be integrally formed or separately provided with the container 200. For example, it may be conceivable that the lid 220 is connected to the container body 230 via a hinge (not displayed). Thus, in this example the lid 220 would be partially removably connected to the container body 230. In FIGS. 2 and 3B, an exemplary embodiment of the lid 220 is displayed, in which the lid 220 is provided separately from the container 200 (and from the container body 230 in particular). However, these examples are not delimiting.

Furthermore, the container 200 may comprise an information carrier (not displayed), such as a barcode or a label, comprising information about the biological specimen comprised therein.

The container 200 further comprises a port 100 forming a unidirectional barrier in a direction from the inside IC to the outside OC of the closed container 200. FIGS. 1A to 3B are particularly suitable for exemplarily illustrating features and characteristics of the port 100.

For example, the port 100 may be a valve. Preferably, the port 100 may be a one-way valve, a duckbill valve or a cross-slits valve. However, this enumeration is only exemplary and not delimiting. In examples, in which the port 100 is a valve, the unidirectional barrier may be formed in relation to the closing properties of the respective valve. According to the present invention, the unidirectional barrier is formed in a direction from the inside IC to the outside OC of the closed container 200. Thus, a corresponding valve of the aforementioned examples would have to mirror this characteristic accordingly and inhibit opening or passage of material or substances in a direction from the inside IC to the outside OC of the closed container 200.

FIGS. 1A to 3B show an embodiment of the port 100 as an elastically deformable valve 110 including resiliently deformable lips 111. The deformable valve 110 may be biased towards a closed position. Preferably, the deformable lips 111 may be urged into the closed position of the deformable valve 110 with the deformable valve 110 being biased to the closed position. For example, the deformable lips 111 can be restorably displaced from their closed position into a position of displacement due to the elasticity of the deformable lips 111. The deformable lips 111 are forced back into their closed position by spring forces once the deformable lips 111 are released from their position of displacement, the closed position of the deformable valve 110 is restored.

As mentioned before, the port 100, e.g. the cross-slit valve, duckbill valve, deformable valve 110 or the like, may be self-sealing in one-direction to prevent backflow of liquids and gases from the container 200 to the outside OC. The port 100 and the aforementioned different valves may be made of silicon, rubber or elastomeric material such as, but not limited to, EPDM, NBR, SBR, fluoroelastomers, perfluoroelastomers or the likes. Duckbill valves, cross-slit valves or the like are well known in the prior art, e.g. EP 0 863 343 B1.

The port 100 may further comprise a closing element 120, such as a plug 121. The closing element 120 may be configured to selectively form a second, preferably bidirectional, barrier between the inside IC and the outside OC of the container 200 by covering or by plugging the port 100. Preferably, the closing element 120 may cover or plug a receiving section of the port 100 for a filling nozzle 300 for dispensing the fixative solution, which is described in more detail below, to enter the inside IC of the container 200. As for example displayed in FIGS. 1A and 1B, the deformable valve 110 may comprise a plug 121, which is connected to the deformable valve 110 and which can be sealingly engaged with a structure on the outside OC side of the deformable valve 100. Thereby, in this example, closing of the deformable valve 110 in both directions may be achieved such that any spillage can be avoided even in case of shocks during the transport and/or preventing accidental or unwanted penetration of the deformable valve 110.

The port 100 may be provided at the lid 220. Alternatively or additionally, the port 100 may be provided at the container body 230. The port 100 may be provided at the center of the lid 220. For example, the port 100 may be a resilient membrane having at least one slit configured to extend across an opening in the lid 220. FIGS. 2 and 3B are particularly suitable for illustrating some of the aforementioned preferred configurations.

In addition, it is also conceivable that the lid 220 is formed by the port 100 (not displayed in the Figures). For example, the port 100 may be adapted such that the port 100 completely encompasses the opening 231 of the container body 230. In this case, for example, the port 100 could be sealing engaged with the container body 230 by screwed fastening.

The system 400 further comprises a dispensing apparatus 500 having the aforementioned filling nozzle 300 for dispensing the fixative solution. FIGS. 4 to 8 show different views of different embodiments of the dispensing apparatus 500.

The filling nozzle 300 is relatively moveable with respect to the container 200 between a retracted position to be outside the container 200 and a filling position to be at least partially inside the container 200 via the port 100 to fill the container 200 with the fixative solution.

For example, FIGS. 4 to 8 illustrate the filling nozzle 300 in its retracted position, in which the filling nozzle 300 is outside OC the container 200. For example, the filling nozzle 300 may be in the retracted position in an vertical upper position when the dispensing apparatus 500 in not dispensing the fixative solution. Thus, in this position the filling nozzle 300 does not interfere with the container 200 during the placement thereof in the dispensing apparatus 500.

The port 100 and the filling nozzle 300 may be configured in correlation with each other such that the unidirectional barrier is maintained when the filling nozzle 300 is in its filling position.

The filling nozzle 300 may have any shape or form that is suitable for dispensing the fixative solution in the container 200 via the port 100. Preferably, the filling nozzle 300 may have any shape or form that is suitable for dispensing the fixative solution in the container 200 via the port 100 while maintaining the unidirectional barrier of the port 100 in the filling position. For example, the filling nozzle 300 may be provided with a tip that is able to penetrate the valve 110 of the lid 220 of the container 200 in the filling position. The port 100 may be configured to wrap (/enclose/surround) (the tip of) the filling nozzle 300 such that the unidirectional barrier is maintained. Thus, the filling nozzle 300 and the port 100 (interact/) collaborate (functionally) together such that the barrier between the inside IC and the outside OC of the closed container 200 is still intact (in at least this direction). Thus, it is safe to dispense the fixative solution inside the container 200 through the filling nozzle 300 in the filling position.

Figure 4:
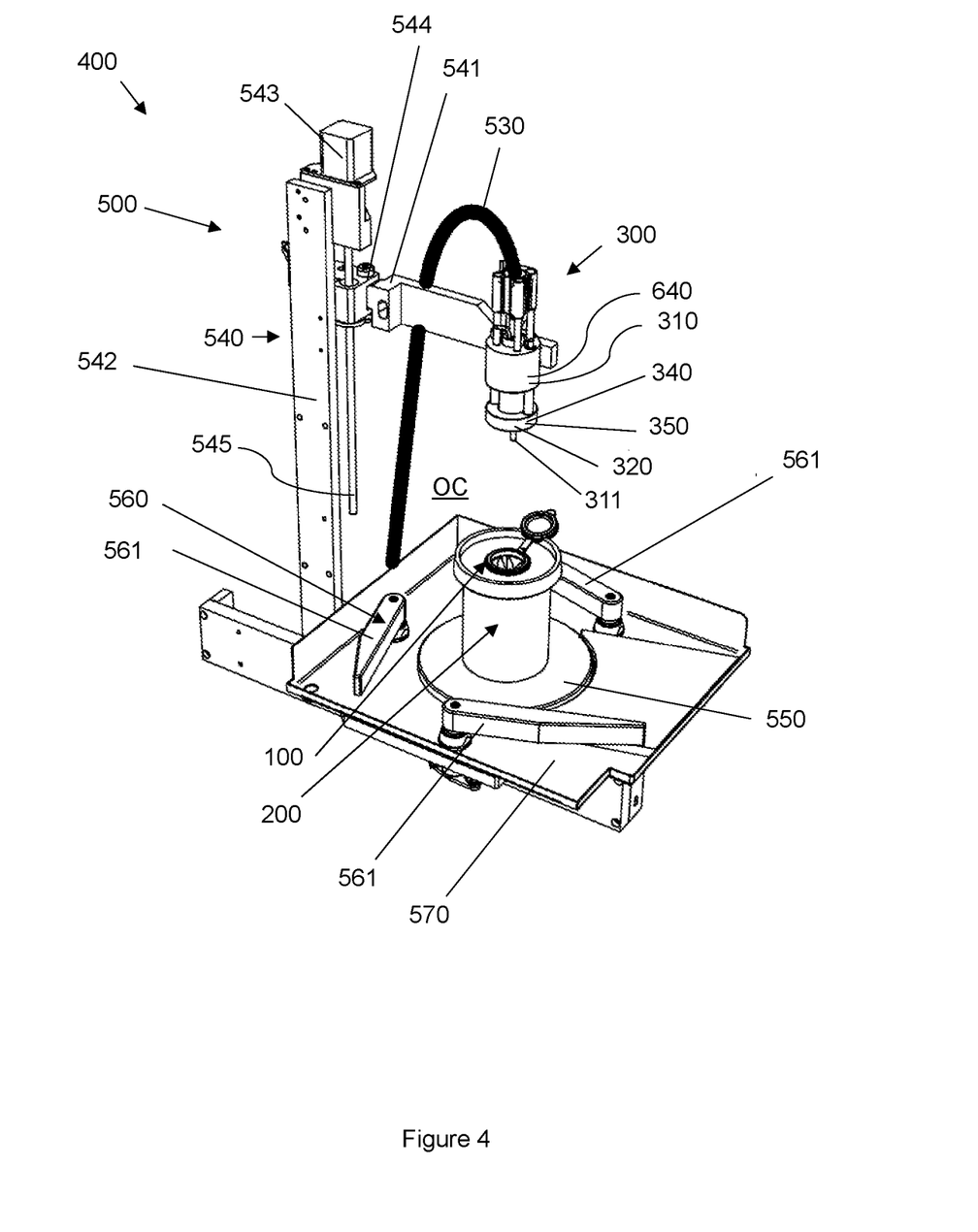
FIG. 4 shows a perspective view of a first embodiment of a system according to the present invention.
Figure 7:
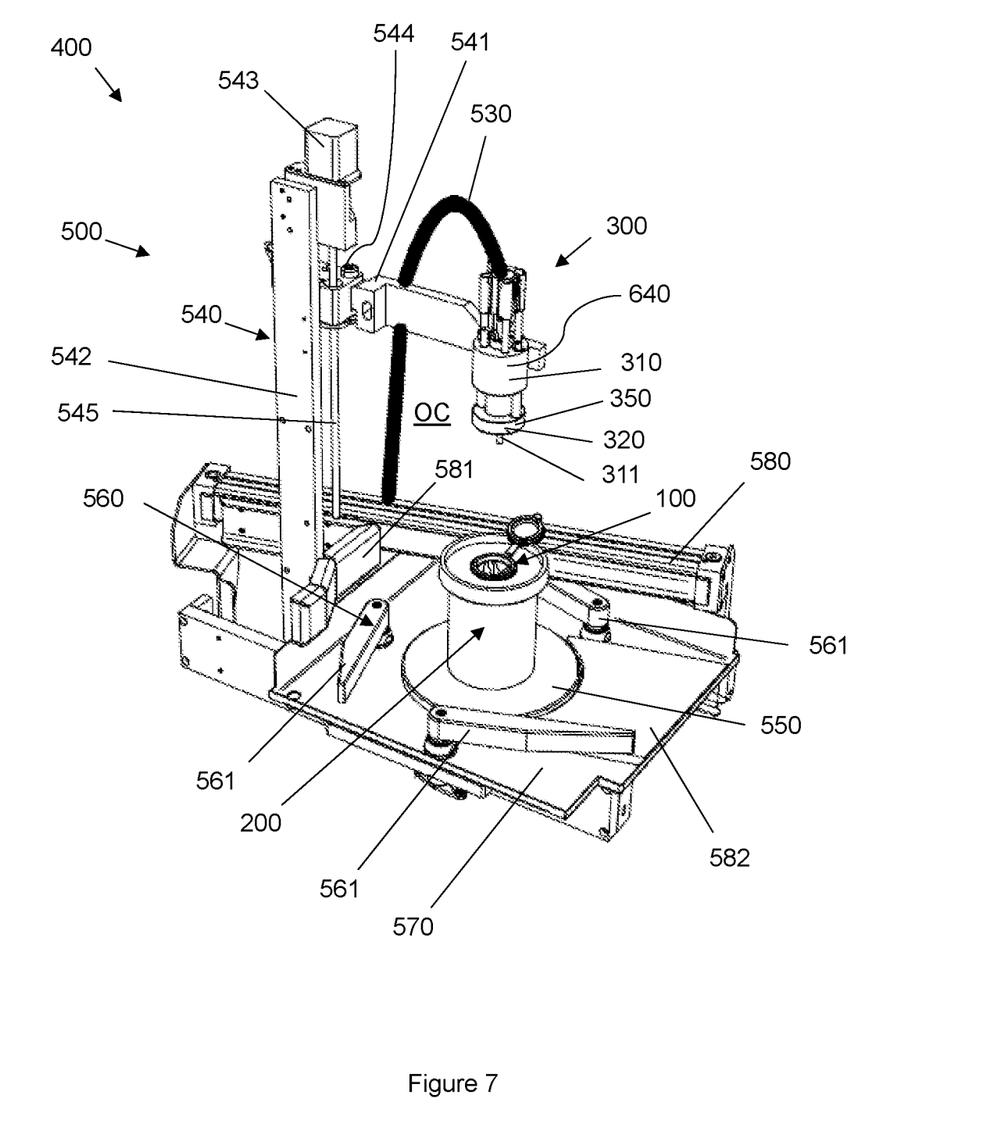
FIG. 7 shows a perspective view of a second embodiment of a system according to the present invention.

The filling nozzle 300 may comprise an antidripping unit 310, such as a valve 311, for controlling, directing and restricting the flow of the fixative solution during the filling process. For example, the antidripping unit 310 may be provided with an anti-dripping valve 311 that prevents any spillage of fixative solution when the filling nozzle 300 is not in the filling position as illustrated in FIGS. 4 and 7. Moreover, the antidripping unit 310 may be disposed at a dispensing outlet or a tip of the filling nozzle 300.

The filling nozzle may further comprise a sensing unit 320, such as a camera. For example, the sensing unit 320 may be a digital camera, an endoscopic camera and/or a contactless sensor. The sensing unit 320 may be configured to determine the position of the container 200 with respect to the filling nozzle 300. For example, it is conceivable that the position of the container 200 is determined by analysing a single or a plurality of digital depiction(s) of the container 200 recorded by the sensing unit 320. The sensing unit 320 may be configured to visualise the biological specimen inside the closed container 200. For example, an endoscopic camera lead through the port 100 can be used for receiving a depiction of the biological specimen inside the closed container 200. Thus, it can be made possible to take a picture of the biological specimen inside the container 200 just before dispensing the fixative solution without having to open the lid 220. Alternatively or additionally, the sensing unit 320 may be configured to determine the filling level of the fixative solution inside the closed container 200. For example, the filling level can be determined by a pressure sensor provided on the filling nozzle 300. Alternatively, it is also conceivable to determine the filling level by laser triangulation or by evaluating a contour formed on the sidewall 232 when emitting light on an opposite side of the container 200. Moreover, the sensing unit 320 may also be configured to determine if the container 200 is closed by the lid 220.

However, it is also conceivable that the dispensing apparatus 500 comprises the sensing unit 320.

The filling nozzle 300 may comprise a hold-down element 340 for holding the container 200 in a (fixed) position at least during the filling process. The hold-down element 340 and the filling nozzle 300 may be relatively moveable to each other. In particular, the hold-down element 340 and the filling nozzle 300 may be moveable along a longitudinal axis of the filling nozzle 300. Thus, in the filling position the filling nozzle 300 may hold the container 200 in a fixed position and then the filling nozzle 300 can be moved relatively to the container 200 and independently from the hold-down element 200. In particular, if the filling nozzle 300 comprises an antidripping unit 310, it may be possible to move also the antidripping unit 310 independently from the container 200 and the hold-down element 340.

However, it is also conceivable that the dispensing apparatus 500 may comprise the hold-down element 340 for holding the container 200 in a (fixed) position.

The filling nozzle 300 may further comprise a sealing cover 350 to selectively and/or sealingly cover the port 100 to the outside OC of the closed container. The sealing cover 350 may cover the port 100 at least in the filling position of the filling nozzle 300. Alternatively or additionally, the hold-down element 340 may comprise the sealing cover 350.

Furthermore, the filling nozzle 300 may be configured to extract fumes escaping the container 200 at least during the filling process, for example by providing a venting unit 640. Preferably, the hold-down element 340 and/or the sealing cover 350 may comprise the venting unit 640 or equipment suitable for extracting fumes.

Alternatively or additionally, the dispensing apparatus 500 may comprise the venting unit 640 for extracting fumes escaping the container 200 at least during the filling process. This is exemplarily illustrated in FIGS. 4 to 8. The venting unit 640 of the dispensing apparatus 500 may be similar or the same as the venting unit 640 described earlier for the filling nozzle 300. However, it is also conceivable that the dispensing apparatus 500 and the filling nozzle 300 each may be provided with the venting unit 640. The working area 570 may be vented by the venting unit 640 for extracting the fumes of the fixative solution that may be vaporized during the filling process. The venting unit 640 may be connected via a venting pipe 641 to a centralized venting system of the facility, for example of the building. Alternatively or additionally, the venting unit 640 may be arranged as a stand-alone venting system, which discharges the vented air in the room via the venting pipe 641. In the case of a stand-alone venting system being required, the venting unit 640 may comprise suitable filters that reduce the level of emission of dangerous fumes, thereby keeping the concentration of such dangerous fumes in the room below the limit that is recommended for human health.

The dispensing apparatus 500 may comprise a working area 570 for receiving the container 200.

Figure 5:
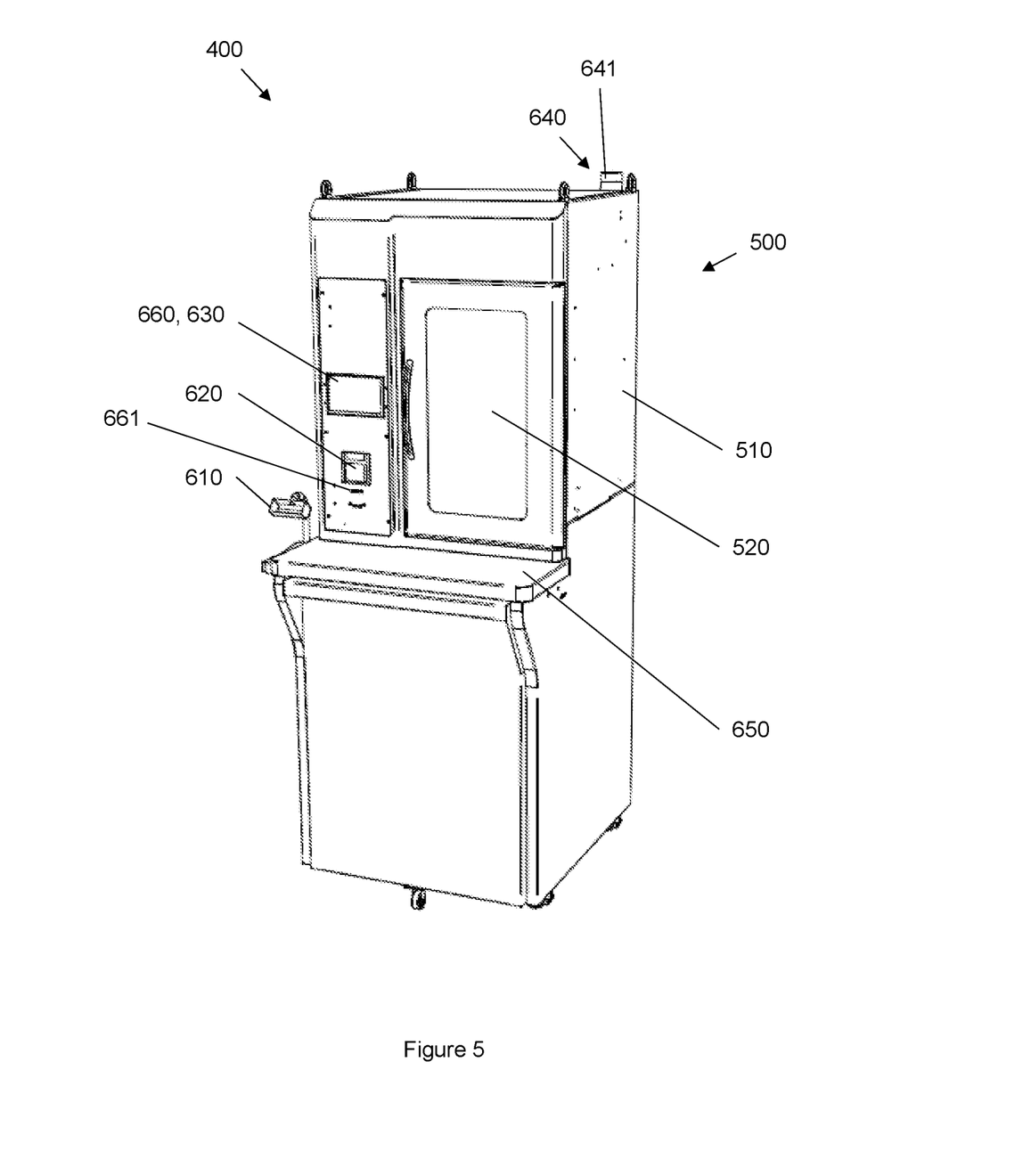
FIG. 5 shows a perspective view of a first embodiment of a dispensing apparatus according to the present invention.
Figure 6:
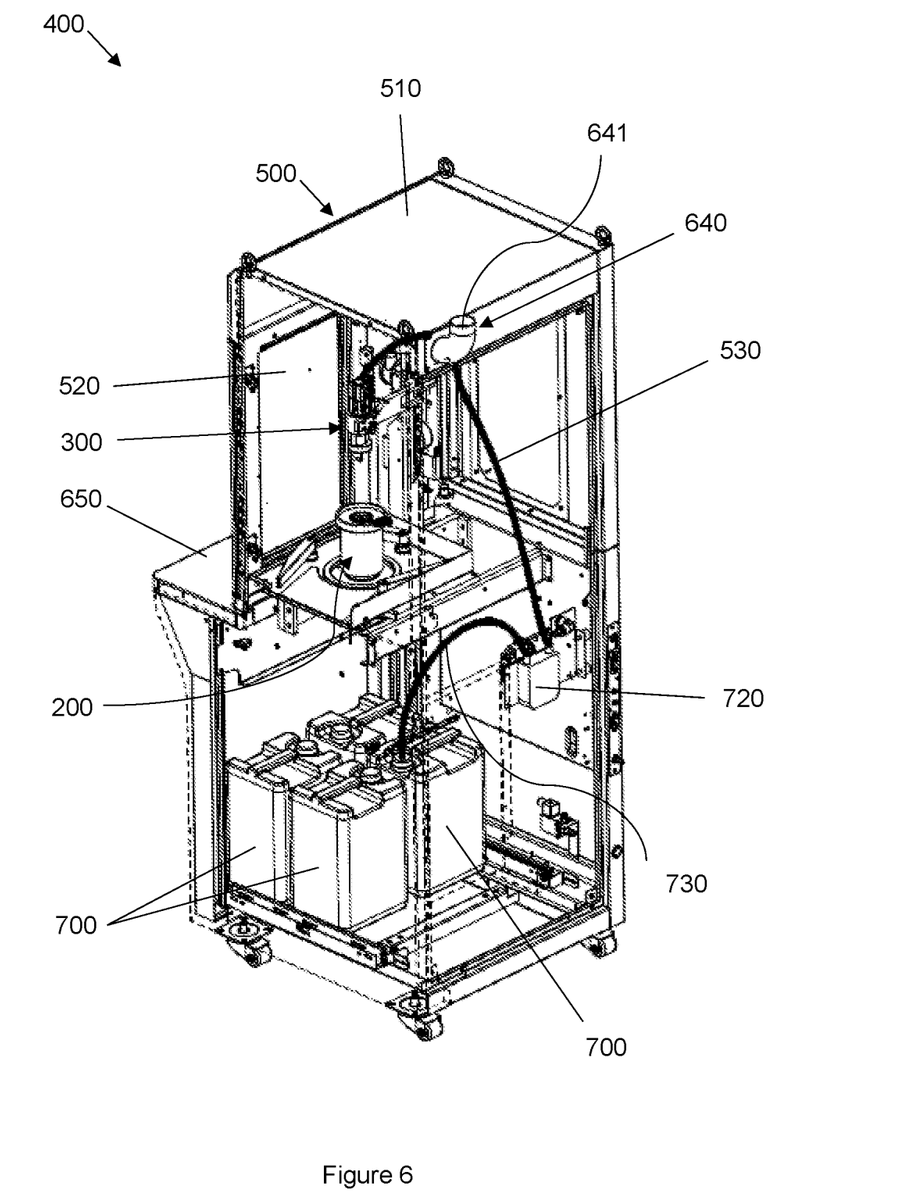
FIG. 6 shows a perspective view of the system from FIG. 4 with the dispensing apparatus from FIG. 5.

The working area 570 may be a closed space, in which the container 200 can be placed for being filled with the fixative solution, such as exemplarily illustrated in FIGS. 4, 6 and 7. The working area 570 may be accessed through a door 520 that allows placing the container 200 inside the working area 570. This is exemplarily illustrated in FIGS. 5, 6 and 8. The door 520 may have a gasket that seals the working area 570 together with the housing 510 of the dispensing apparatus 500 when the door 520 is closed. An electric latch may be provided to keep the door 520 closed to prevent the escape of harmful gases at least during the filling process.

The dispensing apparatus 500 may be provided with a sanitizing unit. For example, the working area 570 may be kept sanitized by being radiated with UV light, i.e. light having wavelengths between 100 and 400 nm. UV light is a well-known for its germicidal effects. The UV light may be switched off when the door 520 is opened to prevent the exposure of humans to this light.

The dispensing apparatus 500 may further comprise a weighing unit 550 for determining the weight of the closed container 200. The weighing unit 550 may be provided at the working area 570, such as exemplarily illustrated in FIGS. 4, 6 and 7. Additionally or alternatively, the weighing unit 550 may be provided in a manner to be selectively moved between a weighing position, such as exemplarily illustrated in FIGS. 4 and 7, and an idle, e.g. retracted, position, such as exemplarily illustrated in FIG. 6. The weighing unit 550 may consist of a support plate that is connected to a load cell. However, the weighing unit 550 may also be implemented by different sensory devices, such as pressure sensors.

The dispensing apparatus 500 may comprise further a moving unit 540. The moving unit 540 may be configured to enable relative movement between the container 200 and the filling nozzle 300 in at least one, preferably six, degrees of freedom of movement. FIGS. 4 and 7 are particularly suitable for illustrating an exemplary embodiment of the moving unit 540. The moving unit 540 may comprise a moveable unit, such as a movable arm 541, for moving the filling nozzle 300 and the container 200 relative to each other. For example, the moving unit 540 may comprise a drive unit 543 that drives an electric stepper motor 544. Movement of the movable arm 541 may be guided along rails 545 in a horizontal and/or vertical direction of the working area 570. The moving unit 540 may further comprise a pole 542, on which the drive unit 543 may be provided. The pole 542 may have a fixed position relative to the working area 570. Thus, by providing the moveable arm 541 as being moveable relatively to the pole 542, the moveable arm 541 may be also relatively moveable to the working area 570. However, the moving unit 540 is not limited to the aforementioned example. Instead, a number of different configurations are conceivable. For example, the moving unit 540 may be configured to move multiple filling nozzles 300 relatively to a multitude of the containers 200. Alternatively, it may also be conceivable that the working area 570 is moved towards the filling nozzle 300.

The moving unit 540 may further comprise a centring unit 560 for arranging the container 200 at a defined position on the working area 570. The centring unit 560 may comprise moveable brackets 561. The moveable brackets 561 may be equally distributed on the working area 570. Preferably, the moveable brackets 561 are moveably linked to each other to simultaneously move with each other. FIGS. 4 and 7 show an exemplary embodiment of the centring unit 560 for arranging the container 200 in the middle of the working area 570. In the Figures, the centring unit 560 comprises at least three moveable brackets 561 that are equally distributed around the circumference of the working area 570. The moveable brackets 561 may be pivotable around an axis of the moveable bracket 561 that is vertical to its longitudinal extend. The pivot axes of the moveable brackets 561 may be equidistantly distributed on a circumference of the working area 570. The circumference of the working area 570 may be configured to be larger than the container 200 to be loaded in the working area 570. The movement of the movable brackets 561 may be synchronized with each other, so that they rotate together with the same amount of degrees and/or at the same angular speed. The moveable brackets 561 may be in a retracted position during loading the container 200 in the working area 570.

The movable brackets may be pivoted with a limited torque once the container 200 is placed on the working area 570 until the moveable brackets 561 reach the defined position, preferably a centred position. The defined (centred) position may be a position that may be similar or identical to the filling position of the filling nozzle 300 (along the working area 570). During the pivoting process, the moveable brackets 561 may come into contact with the container 200 such that the container 200 is forced into the centre of the working area 570. The torque applied by the centring unit 560 may be chosen such that it is strong enough to move the container 200, but that it is limited to prevent destruction of the container 200 once the container 200 has been moved in the middle of the working area 570. The moveable brackets 561 may be configured that no further movement or displacement of the container 200 is possible in the defined (centred) position. The angular limits for allowable rotation of the moveable brackets 561 between the retracted position and the defined (centred) position may be 90 degrees. The length of the moveable brackets 561 may be adapted such that the moveable brackets 561 are long enough to engage even with comparatively small containers 200. The pivotable movement of the moveable brackets 561 may be achieved through an electric motor, preferably having a torque limiter. The electric motor may be connected to corresponding structures relating to the axis of the moveable bracket 561 through a synchronous belt.

The filling nozzle 300 may be provided in a position along the working area 570 that is aligned with the defined (centred) position.

The system 400 may further comprise a control unit 660 for controlling the dispensing apparatus 500, the filling nozzle 300, the sensing unit 320, the moving unit 540, and/or the weighing unit 550. The control unit 660 may be a computer with a touchscreen display or an electronic control board that manages all the electrical devices and sensors. The control unit 660 may comprise an interface unit 661 for communicating and/or distributing information relating to the system 400 via a communication network. For example, the control unit 660 may be provided with a communication line, such as an Ethernet connection, to share data about the dispensing procedure, preferably related to each biological specimen, with a Laboratory Information System or with a server computer.

The control unit 660 may be configured to determine, preferably numerically determine, the amount of the fixative solution required for the biological specimen, preferably based on characteristics of the biological specimen, such as weight, type, volume and/or dimension of the biological specimen inside the closed container 200.

The system 400 and/or the dispensing apparatus 500 may further comprise a label printer 620 for printing information related to the filling process, e.g. collected by the control unit 660. This is exemplarily displayed in FIGS. 5 and 8.

Alternatively or additionally, the system 400 and/or the dispensing apparatus 500 may comprise a code reader 610 for reading a code, like a 2D barcode. The code reader 610 may be configured to transmit information of said code to the control unit 660. For example, the control unit 660 can be provided with a code reader 610, such as a barcode scanner or a RFID/NFC reader, to identify the container 200 and the biological specimen enclosed therein before dispensing the fixative solution. This is exemplarily displayed in FIGS. 5 and 8.

Alternatively or additionally, the system 400 and/or the dispensing apparatus 500 and/or the control unit 660 may comprise a control terminal 630 for operating the control unit 660. For example, a touch display may be provided to operate the dispensing apparatus 500. This is exemplarily displayed in FIGS. 5 and 8.

Alternatively or additionally, the system 400 and/or the dispensing apparatus 500 may comprise a receiver unit 650 for moving the container 200 into the dispensing apparatus 500 and preferably onto the working area 570. For example, in FIGS. 5 and 8, the receiver unit 650 is displayed as a work top 650. The work top 650 is provided for placing the closed container 200 on the dispensing apparatus 500 and manually moving the container 200 onto the working area 570. However, it is conceivable that this process can be automated by providing an electric stepper motor and a corresponding pusher arm or a conveyor band. In particular, the receiver unit 650 may be controlled by the control unit 660.

Furthermore, the system 400 and preferably the dispensing apparatus 500 may further comprise a tubing system, such as exemplarily displayed in FIG. 6. The tubing system may consist of a nozzle tube 530 and a tank tube 730. The nozzle tube 530 connects the filling nozzle 300 to a metering pump 720, e.g. a peristaltic pump. The metering pump 720 may be connected by the tank tube 730 to one or more tanks 700 containing the fixative solution.

Figure 8:
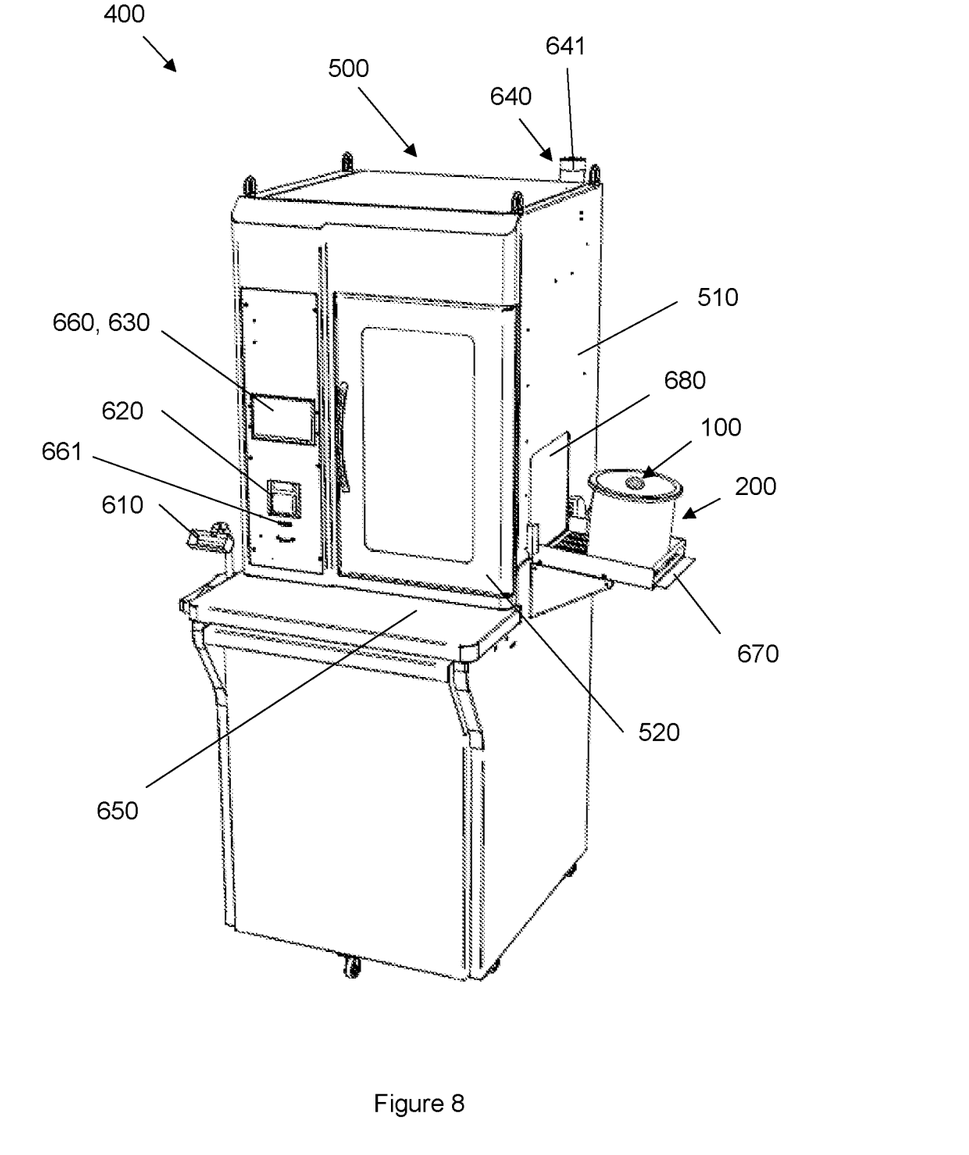
FIG. 8 shows a perspective view of a second embodiment of a dispensing apparatus according to the present invention.

FIGS. 7 and 8 show a second embodiment of the system 400 and preferably of the dispensing apparatus 500 of the present invention.

In comparison to the previously described embodiment of FIGS. 4 to 6, the system 400 and preferably the dispensing apparatus 500 may further comprise a storage area 670 for storing preferably filled containers 200 after the filling process. Alternatively, it is also conceivable that the storage area 670 is provided for storing the containers 200 before the filling process.

Moreover, the system 400 and preferably the dispensing apparatus 500 may further comprise an ejector unit 580 for moving the container 200 out of the dispensing apparatus 500, preferably out from the working area 570, to the storage area 670. The ejector unit 580 may be controlled by the control unit 660. For example, the ejector unit 580 may be provided as a push arm 581 as displayed in FIG. 7. For example, the push arm 581 may be linearly moved, preferably such that the push arm 581 is guided along a rail to eject the container 200 from the working area 570. However, it also conceivable to provide the ejector unit 580 by a movable slide 582 that can be lowered after completion of the filling process and raised before the beginning of a new filling process.

According to a second aspect of the present invention, a method for filling a container 200 with a fixative solution is disclosed, comprising the following steps:

The system 400 described hereinbefore is provided. In particular, the dispensing apparatus 500 of the system 400 described hereinbefore is provided. Further, an empty container 200 for receiving a biological specimen suitable for being used in the aforementioned system 400 is provided.

Then, a biological specimen is placed inside the container body 230. Subsequently, the container 200 is closed with the lid 220.

For example, a nurse, in the operating room, may put a biological specimen excised from a patient in the container 200 and may immediately close the container 200 using the lid 220 comprising a valve 110. The nurse may not reopen the container 200 until it arrives in the laboratory for examination. The nurse may apply a label or a tag with a code on the container 200, preferably in manner to clearly identify the container 200 and the biological specimen contained therein. Such code can be a barcode, a 2D code, e.g. a datamatrix, QR-code, etc., or an RFID/NFC tag. Once the container 200 is closed and labelled, the closed container 200 with the biological specimen may be moved to the dispensing apparatus 500. An operator or the nurse may use the code reader 610 of the dispensing apparatus 500 to read the code previously labelled or tagged on the container 200 to associate this code to subsequent information acquired during the dispensing procedure. Then, the operator may open the door 520 to the working area 570 of the dispensing apparatus 500.

The closed container 200 is placed then inside the dispensing apparatus 500. For example, the operator may put the closed container 200 with the biological specimen onto the working area 570 and then the door 520 may be closed.

Subsequently, the operator may select through the control terminal 630 a dispensing ratio, i.e. the sample-weight/reagent-weight ratio. The operator may choose a dispensing ratio that is suitable for the biological specimen contained in the container 200, since the dispensing ratio varies for each biological specimen. For example, the dispensing ratio may depend on the type of organ. Therefore, the control terminal 630 may be configured to suggest a list of preferred ratios based on the types of biological specimen. Typical dispensing ratios may range from 1:1 to 1:20. However, it is also conceivable that the type of the biological specimen and the related dispensing ratio are automatically selected by the dispensing apparatus 500, preferably the control unit 660. Therefore, the dispensing apparatus 500 may be configured to query a database to obtain the type of the biological specimen inside the container 200 based on the code that was tagged or labelled on the container 200 in the operating room, if the dispensing apparatus 500 is connected to an information system of the facility, e.g. a server that contains all the data regarding patients and biological specimens, for example via the interface unit 661. Alternatively, a desired or actual ratio between the volume of the fixative solution in the container 200 and the weight of the biological specimen in the container 200 may be calculated. The dispensing apparatus 500 and preferably the control unit 660 may then select a suitable dispensing ratio automatically.

Subsequently, the operator may start the dispensing procedure by pushing a button on the touchscreen display of the control terminal 630.

Then, the port 100 of the container 200 may be aligned with the filling nozzle 300 before entering the inside IC of the container 200 with the filling nozzle 300.

For example, the centring unit 560 may be activated and the movable brackets 561 may displace the closed container 200 such that the container 200 is positioned in the center of the working area 570. Then, the movable brackets 561 may be moved back to their retracted position. Thus, the port 100 of the closed container 200 is aligned with the filling nozzle 300.

Subsequently, the weight of the closed container 200 may be determined in the retracted position of the filling nozzle 300. Thus, the weight of the closed container 200 comprising merely the biological specimen can be determined.

For example, the weighing unit 550 may acquire the gross weight of the closed container 220 with the biological specimen. Since the weight of the closed container 200 in its empty state can be determined in advance, the dispensing apparatus 500 may easily calculate the weight of the biological specimen by subtracting the known weight of the empty container 200 from the measured gross weight.

The filling nozzle 300 is then relatively moved to the container 200 from its retracted position to its filling position to enter the inside IC of the container 200 with the filling nozzle 300 through the port 100, preferably such that the unidirectional barrier is maintained.

For example, the filling nozzle 300 may be moved relatively to the container 200 until it penetrates the port 100 of the lid 220 of the container 200. The endoscopic digital camera of the sensing unit 320 may be provided on the filling nozzle 300 to take a picture of the biological specimen contained in the closed container 200.

The fixative solution is then dispensed via the filling nozzle 300 through the port 100 in the filling position.

For example, the anti-dripping valve 311, which may be provided on the filling nozzle 300, may then be opened and the metering pump 720 may start to dispense the required amount of fixative solution from the tank 700 to the closed container 200 in accordance with the dispensing ratio selected before.

In the meantime, the weight of the closed container 200 may be determined in the filling position of the filling nozzle 300, preferably by the weighing unit 550.

For example, the weighing unit 550 may acquire the new gross weight of the closed container 200 with the biological specimen and the fixative solution contained therein. Preferably, the control unit 660 may execute a check of the effective dispensing ratio, whereby the previous gross weight of the container 200 is compared with its current gross weight. In fact, in case of malfunctions of the metering pump 720 or damage on the tubing system, it may happen that the proper amount of fixative solution is not dispensed. By (continuously/repeatedly) weighing the dispensing apparatus 500 is able to identify such failure and thus, it is possible to raise a warning to the operator through the control terminal 630.

At the end of the dispensing procedure the anti-dripping valve 311, which may be provided on the filling nozzle 300, may be closed (again). Then, the filling nozzle 300 is moved relative to the container 200 into its retracted position. Subsequently, the weight of the closed container 200 may be determined in the retracted position of the filling nozzle 300. Thus, in this step the weight of the closed container 200 comprising the biological specimen and the fixative solution dispensed therein can be determined.

The door 520 may remain locked by an electric latch during all the aforementioned steps and may stay locked for further few seconds after the completion of such operations to allow the removal of harmful fumes from the working area 570 by the venting system 640 before opening the door 520.

After that, the door 520 may be unlatched and the label printer 620 may print a label, an information sheet, or a protocol containing the information regarding the executed dispensing procedure. Such information may comprise, for example, date, time, specimen identification code, specimen type, sample weight, reagent weight, dispensing ratio, reagent (fixative solution) name, operator name and/or warnings. The user can thus open the door 520 of the working area 570. Then, the closed and filled container 200 may be removed from the dispensing apparatus 500 and the printed label may be stuck on the container 200.

Then, the information related to the filling process may be transferred via the interface unit 661, for example to a database.

For example, if the dispensing apparatus 500 is connected to the information system of the facility (e.g. to the server that contains all the data regarding patients and specimens), the dispensing apparatus 500 may send to this information system the information regarding the executed dispensing procedure. Preferably, the information may be linked to the code that was tagged or labelled on the container 200 initially (in the operating room).

Then, the port 100 may be covered with the closing element 120 after having filled the container 200 with the fixative solution.

For example, the operator may engage the plug 121 of the valve 110 in the external side of the valve 110 for providing extra safety against shocks during the transport and/or for preventing accidental or unwanted penetration of the valve 110. Thus, the container 200 with the biological specimen and the fixative solution contained inside the closed container 200 is then ready to be transported to the histology laboratory or anatomical pathology laboratory for analysis.

The steps of the method may be automatically completed by the control unit 660.

In another embodiment, the dispensing apparatus 500 may further comprise an ejector unit 580 that may be configured to (automatically) push the such filled container 200 (comprising the biological specimen and the fixative solution) out from the working area 570 to the storage area 670. In particular, the filled container 200 may be ejected out of the dispensing apparatus 500 and may be preferably stored in the storage area 670. Alternatively or additionally, the ejector unit 580 may push the container 200 to a conveyor belt through an automated shutter door 680 (see FIG. 8) present on one side of the working area 570 once the filling procedure has been completed. In such embodiment, there is no need for an operator to remove the filled container 200 from the working area 570 at the end of the dispensing procedure. In such case, a label containing the information regarding the executed dispensing procedure is not printed, since the operator is not present at the end of the dispensing procedure for sticking the label on the container 200. For this reason, in such embodiment, the connection of the dispensing apparatus 500 to the information system of the facility, e.g. to the server that contains all the data regarding patients and specimens, is preferred for transferring the information regarding the executed dispensing procedure.

According to a third aspect of the present invention, the present invention relates to the use of the container 200, which is used in the system 400 described hereinbefore. In particular, the container 200 comprises the container body 230 for receiving a biological specimen, the lid 220 for selectively closing the container body 230, and the port 100 forming a unidirectional barrier in a direction from the inside IC to the outside OC of the closed container 200.

Furthermore, the scope of the present invention is not delimited by an element being described only as a single occurrence. Instead, it is also conceivable that the respective element is provided several times in the system 400, the dispensing apparatus 500 and the container 200 of the present invention.

Moreover, it is also conceivable that the filling nozzle 300 is provided for simultaneously or individually filling several containers 200, which are placed on the working area 570. For example, the moving unit 540 may be provided with the moveable arm 541 that comprises more than one of the filling nozzle 300 described hereinbefore. Thereby, simultaneous filling of several containers 200, which, for example, are arranged in a row, can be accomplished. Thus, it becomes apparent that the present invention provides also solutions for filling multiple closed containers with the fixative solution.

The present invention is not limited by the embodiments as described hereinabove, as long as being covered by the appended claims. All the features of the embodiments described herein above can be combined in any possible way and can be interchangeably provided.

The invention claimed is:
1. System (400) for filling a closed container (200) with a fixative solution, comprising:
  a container (200) comprising a container body (230) for receiving a biological specimen, a lid (220) for selectively closing the container body (230) and a port (100) forming a unidirectional barrier in a direction from the inside (IC) to the outside (OC) of the closed container (200);
  a dispensing apparatus (500) having a filling nozzle (300) for dispensing the fixative solution;
    wherein the filling nozzle (300) is relatively moveable with respect to the container (200) between a retracted position to be outside the container (200) and a filling position to enter the inside (IC) of the container (200) with the filling nozzle (300) through the port (100) to fill the container (200) with the fixative solution;
    wherein the port (100) and the filling nozzle (300) are configured in relation with each other such that the unidirectional barrier is maintained when the filling nozzle (300) is in its filling position;
    wherein in the filling position the filling nozzle (300) penetrates the port (100), wherein the dispensing apparatus (500) further comprises a moving unit (540), wherein the moving unit (540) moves the filling nozzle (300) and the container (200) relative to each other; and
    wherein the dispensing apparatus (500) further comprises a weighing unit (550) for determining the weight of the closed container (200); and
    wherein the dispensing apparatus (500) further comprises a control unit (660) for controlling the dispensing apparatus (500), the filling nozzle (300), the moving unit (540) and the weighing unit (550), for controlling interactions between the respective elements,
    wherein the control unit (660) is configured to determine the amount of the fixative solution required for the biological specimen inside the closed container (200) based on weight and/or on dimensions of the biological specimen.
2. System (400) according to claim 1, wherein the port (100) is a one-way valve, and/or
  wherein the port (100) comprises a closing element (120) for selectively forming a second bidirectional, barrier between the inside (IC) and the outside (OC) of the container (200) by covering or by plugging the port (100).

3. System (400) according to claim 1, wherein the container body (230) comprises a bottom wall (233) and at least one sidewall (232), and/or
wherein the lid (220) is at least partially removably connected to the container body (230) for selectively closing the container (200), and
wherein the lid (220) is configured to sealingly or hermetically close the container (200).

4. System (400) according to claim 1, wherein the port (100) is provided at the lid (220) and/or at the container body (230).

5. System (400) according to claim 1, wherein the dispensing apparatus (500) comprises a sensing unit (320),
wherein the sensing unit (320) is configured to determine the position of the container (200) with respect to the filling nozzle (300), and/or
wherein the sensing unit (320) is configured to determine the filling level of the fixative solution inside the closed container (200).

6. System (400) according to claim 1, wherein the dispensing apparatus (500) comprises a working area (570) for receiving the container (200), and/or
wherein the weighing unit (550) is provided at the working area (570).

7. System (400) according to claim 1, wherein the moving unit (540), comprises a centring unit (560) for arranging the container (200) at a defined position on the working area (570).

8. System (400) according to claim 1, further comprising a hold-down element (340) for holding the container (200) in a position at least during the filling process,
wherein the filling nozzle (300) comprises the hold-down element (340), and/or
wherein the filling nozzle (300) further comprises a sealing cover (350) to selectively cover the port (100) to the outside (OC), at least in the filling position of the filling nozzle (300).

9. System (400) according to claim 1, wherein the dispensing apparatus (500), further comprises a venting unit (640) for extracting fumes escaping the container (200) at least during the filling process.

10. System (400) according to claim 1, wherein the system (400 further comprises at least one of
a label printer (620) for printing information related to the filling process, e.g. collected by the control unit (660),
a code reader (610) for reading a code, and for transmitting the information of said code to the control unit (660),
a control terminal (630) for operating the control unit (660),
a storage area (670) for storing filled containers (200) before and/or after the filling process,
a receiver unit (650) for moving the container (200) into the dispensing apparatus (500), or
an ejector unit (580) for moving the container (200) out of the dispensing apparatus (500).

11. Method for filling a container (200) with a fixative solution, comprising the following steps:
providing a system (400) according to claim 1,
placing a biological specimen inside the container body (230);
closing the container (200) with the lid (220);
placing the closed container (200) inside the dispensing apparatus (500);
moving the filling nozzle (300) relatively to the container (200) from its retracted position to its filling position until the filling nozzle (300) penetrates the port (100) to enter the inside (IC) of the container (200) with the filling nozzle (300) through the port (100);
dispensing the fixative solution via the filling nozzle (300) through the port (100) in the filling position, and
moving the filling nozzle (300) relative to the container (200) into its retracted position.

12. Method according to claim 11, additionally comprising at least one of the following steps:
determining the weight of the closed container (200) in the filling position of the filling nozzle (300);
determining the weight of the closed container (200) in the retracted position of the filling nozzle (300);
aligning the port (100) of the container (200) with the filling nozzle (300) before entering the inside (IC) of the container (200) with the filling nozzle (300);
calculating a desired or actual ratio between the volume of the fixative solution in the container (200) and the weight of the biological specimen in the container (200);
covering the port (100) with the closing element (120) after having filled the container (200) with the fixative solution;
ejecting the filled container (200) out of the dispensing apparatus (500) and storing the container (200) in a storage area (670) for storing filled containers (200) before and/or after the filling process;
transferring information related to the filling process via an interface unit (661) for communicating and distributing information relating to the system 400 via a communication network; and
automatically completing the steps of the method by the control unit (660).

13. Method of using container (200) in the system (400) according to claim 1, comprising
a container body (230) for receiving a biological specimen,
a lid (220) for selectively closing the container body (230), and
a port (100) forming a unidirectional barrier in a direction from the inside (IC) to the outside (OC) of the closed container (200).

* * * * *